US011876273B2

(12) United States Patent
Park et al.

(10) Patent No.: US 11,876,273 B2
(45) Date of Patent: Jan. 16, 2024

(54) TERMINAL PORTION CONFIGURED TO CONNECT AN RF SIGNAL CONNECTOR TO AN ELECTRODE PAD OF AN EXTERNAL DEVICE OVER A PREDETERMINED DISTANCE

(71) Applicant: KMW INC., Hwaseong-si (KR)

(72) Inventors: Nam Shin Park, Hwaseong-si (KR); Joung Hoe Kim, Hwaseong-si (KR); Sung Ho Jang, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 17/118,688

(22) Filed: Dec. 11, 2020

(65) Prior Publication Data

US 2021/0098852 A1 Apr. 1, 2021

Related U.S. Application Data

(63) Continuation of application No. PCT/KR2019/007078, filed on Jun. 12, 2019.

(30) Foreign Application Priority Data

Jun. 12, 2018 (KR) ........................ 10-2018-0067396
Jun. 12, 2019 (KR) ........................ 10-2019-0069123

(51) Int. Cl.
*H01P 1/04* (2006.01)
*H01P 1/203* (2006.01)
(Continued)

(52) U.S. Cl.
CPC .............. *H01P 1/045* (2013.01); *H01P 1/207* (2013.01); *H01P 1/20309* (2013.01); *H01P 5/085* (2013.01)

(58) Field of Classification Search
CPC .......... H01P 1/203; H01P 1/207; H01P 1/045; H01P 5/085; H01R 13/24; H01R 13/2407; H01R 13/2435; H01R 13/2421
(Continued)

(56) References Cited

U.S. PATENT DOCUMENTS 5,329,262 A 7/1994 Fisher, Jr.
2012/0249266 A1 10/2012 Lim et al.
(Continued)

FOREIGN PATENT DOCUMENTS

CN 101312355 A 11/2008
CN 201230025 Y 4/2009
(Continued)

OTHER PUBLICATIONS

Chinese office action dated Jul. 21, 2021 from the Chinese Patent Office for Chinese Application No. 2019800397163.
(Continued)

*Primary Examiner* — Benny T Lee
(74) *Attorney, Agent, or Firm* — Insight Law Group, PLLC; Seung Lee

(57) ABSTRACT

The present disclosure relates to a cavity filter and a connecting structure included therein. The cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: first side terminal contacted with the electrode pad; and the second side terminal connected to the RF signal connecting portion.
(Continued)

Therefore, the cavity filter can efficiently absorb assembly tolerance which occurs through assembly design, and prevents disconnection of an electric flow, thereby preventing degradation in performance of an antenna device.

15 Claims, 17 Drawing Sheets

(51) Int. Cl.
*H01P 1/207* (2006.01)
*H01P 5/08* (2006.01)

(58) Field of Classification Search
USPC .......................... 333/208
See application file for complete search history.

(56) References Cited

U.S. PATENT DOCUMENTS

| | | | | |
|---|---|---|---|---|
| 2015/0061794 | A1 | 3/2015 | Tong | |
| 2016/0254067 | A1 | 9/2016 | Lee et al. | |
| 2018/0131153 | A1 | 5/2018 | Flaherty, IV | |
| 2021/0098849 | A1* | 4/2021 | Park | H01R 24/42 |
| 2021/0098851 | A1* | 4/2021 | Park | H01P 1/2088 |

FOREIGN PATENT DOCUMENTS

| | | | |
|---|---|---|---|
| CN | 102136616 | A | 7/2011 |
| CN | 106057771 | A | 10/2016 |
| CN | 206441844 | U | 8/2017 |
| JP | 2007-006529 | A | 1/2007 |
| JP | 2007-281834 | A | 10/2007 |
| KR | 10-2011-0041919 | A | 4/2011 |
| KR | 1020110041919 | A | 4/2011 |
| KR | 10-2016-0119942 | A | 10/2016 |
| KR | 10-2018-0055772 | A | 5/2018 |
| KR | 1020180055772 | A | 5/2018 |
| WO | 2018/093176 | A2 | 5/2018 |

OTHER PUBLICATIONS

International Search Report for PCT/KR2019/007078 dated Sep. 24, 2019 and its English translation.

Japanese office action dated Feb. 1, 2022 for Japanese Application No. 2020-569043.

Extended European Search Report dated May 24, 2022 for European Application No. 19818819.5.

* cited by examiner

TERMINAL PORTION CONFIGURED TO CONNECT AN RF SIGNAL CONNECTOR TO AN ELECTRODE PAD OF AN EXTERNAL DEVICE OVER A PREDETERMINED DISTANCE

CROSS-REFERENCE TO RELATED APPLICATIONS

This application is a Continuation Application of International Application No. PCT/KR2019/007078, filed on Jun. 12, 2019, which claims priority and benefits of Korean Application Nos. 10-2018-0067396, filed on Jun. 12, 2018, and 10-2019-0069123, filed on Jun. 12, 2019, the disclosures of which are incorporated herein by reference in their entirety.

TECHNICAL FIELD

The present disclosure relates to a cavity filter and a connecting structure included therein, and more particularly, to a cavity filter for a massive MIMO (Multiple-Input Multiple-Output) antenna, which improves a connector fastening structure between a filter and a PCB (Printed Circuit Board) in consideration of assembly performance and size, and a connecting structure included therein.

BACKGROUND ART

The contents described in this section simply provide background information on the present disclosure, and do not constitute the prior art.

Multiple Input Multiple Output (MIMO) refers to a technology capable of significantly increasing a data transmission capacity by using a plurality of antennas, and is a spatial multiplexing technique in which a transmitter transmits different data through respective transmitting antennas and a receiver sorts the transmitted data through a suitable signal processing operation. Therefore, when the number of transmitting antennas and the number of receiving antennas are increased at the same time, the channel capacity may be increased to transmit more data. For example, when the number of antennas is increased to 10, it is possible to secure a channel capacity ten times larger than in a current single antenna system, even though an identical frequency band is used.

In the 4G LTE-advanced technology, up to 8 antennas are used. According to the current pre-5G technology, a product having 64 or 128 antennas mounted therein is being developed. When the 5G technology is commercialized, it is expected that a base station equipment with much more antennas will be used. This technology is referred to as "massive MIMO." Currently, cells are operated in a 2D manner. However, when the massive MIMO technology is introduced, 3D-beamforming becomes possible. Thus, the massive MIMO technology is also referred to as "FD (Full Dimension)-MIMO."

According to the massive MIMO technology, the numbers of transceivers and filters are increased with the increase in the number of antennas. As of 2014, 200,000 or more base stations are installed in Korea. That is, there is a need for a cavity filter structure which can be easily mounted while minimizing a mounting space. Furthermore, there is a need for an RF signal line connecting structure which provides an equal level of filter characteristics even after individually tuned cavity filters are mounted in antennas.

An RF filter having a cavity structure includes a resonator provided in a box structure formed of a metallic conductor, the resonator being configured as a resonant bar or the like. Thus, the RF filter has only a natural frequency of electromagnetic field to transmit only a specific frequency, e.g. an ultra-high frequency, through resonance. A band pass filter with such a cavity structure has a low insertion loss and high power. Thus, band pass filters are utilized in various manners as filters for mobile communication base station antennas.

SUMMARY OF THE INVENTION

Technical Problem

An object of the present disclosure is to provide a cavity filter which has a slimmer and more compact structure and includes an RF connector embedded therein in a height direction thereof, and a connecting structure included therein.

Another object of the present disclosure is to provide a cavity filter which is assembled through an assembly method capable of minimizing the cumulated assembly tolerance which occurs when a plurality of filters are assembled, and has an RF signal connection structure that can facilitate mounting and uniformly maintain the frequency characteristics of the filters, and a connecting structure included therein.

Still another object of the present disclosure is to provide a cavity filter which can prevent a signal loss by applying lateral tension, while allowing a relative motion for a cavity filter having a separable RF pin, and a connecting structure therein.

Yet another object of the present disclosure is to provide a cavity filter which can maintain a constant contact area between two members to be electrically connected to each other, while absorbing assembly tolerance between the two members, and can be installed through a clear and simple method, and a connecting structure included therein.

The technical problems of the present disclosure are not limited to the above-described technical problems, and other technical problems which are not mentioned can be clearly understood by the person skilled in the art from the following descriptions.

Technical Solution

In one general aspect, a cavity filter includes: an RF signal connecting portion spaced apart, by a predetermined distance, from an external device having an electrode pad provided on a surface thereof; and a terminal portion configured to electrically connect the electrode pad of the external device and the RF signal connecting portion so as to absorb assembly tolerance existing at the predetermined distance and to prevent disruption of the electric flow between the electrode pad and the RF signal connecting portion, wherein the terminal portion includes: a first terminal which is in contact with the electrode pad; and a second terminal connected to the RF signal connecting portion.

The cavity filter may include a filter body which includes a terminal insertion port. The terminal portion may be provided inside the terminal insertion port. The filter body may further include the RF signal connecting portion.

The cavity filter may further include a dielectric body inserted into the terminal insertion port so as to cover an outer surface of the terminal portion.

The dielectric body may have a terminal through-hole in which a part of the terminal portion penetrates, and any one of the first terminal and the second terminal, which penetrates the terminal through-hole, may have a larger diameter than the terminal through-hole so as to be locked to the dielectric body.

The first terminal of the terminal portion may be disposed in the terminal insertion port and moved along with the dielectric body by an assembly force provided by an assembler, the second terminal of the terminal portion may be connected to the RF signal connecting portion, and a part of any one of the first terminal and the second terminal may be inserted into the other so as to be engaged with the other by a predetermined length.

The cavity filter may further include an elastic member positioned on an outer circumferential surface of the dielectric body, and configured to elastically support the dielectric body when the dielectric body is moved in the terminal insertion port by the assembly force applied by the assembler.

The elastic member may include two stacked O-rings.

Any one of the first terminal and the second terminal may have a plurality of tension cut portions.

The tension cut portions may be provided in the first terminal, and a part of a top portion of the second terminal may be inserted in a part of a bottom portion of the first terminal.

The tension cut portions may be provided in the second terminal, and a part of a lower end portion of the first terminal may be inserted in a part of a top portion of the second terminal.

The dielectric body may support an outer circumferential surface of the any of the first terminal or the second terminal having the plurality of tension cut portions formed therein.

The cavity filter may further include a reinforcement plate configured to reinforce the RF signal connecting portion provided in the terminal insertion port.

The reinforcement plate may be fixed to an insertion slot support portion protruding toward the terminal insertion port, as a part of the filter body.

The reinforcement plate may have a terminal through-hole in which a part of the terminal portion penetrates, and any one of the first terminal and the second terminal, which penetrates the terminal through-hole, may have a larger diameter than the terminal through-hole so as to be locked to the reinforcement plate.

The second terminal of the terminal portion may be soldered and fixed to a solder hole formed in a plate extended from the RF signal connecting portion.

A contact portion of the first terminal of the terminal portion, which is in contact with the electrode pad, may have an upper end formed in a rounded cone shape with a predetermined contact area.

A contact portion of the first terminal of the terminal portion, which is in contact with the electrode pad, may have a rounded upper end formed in a hemispherical shape with a predetermined contact area.

In another general aspect, a connecting structure includes: an RF signal connecting portion spaced apart, by a predetermined distance, from external device having an electrode pad provided on a surface thereof; and a terminal portion configured to electrically connect the electrode pad of the external device and the RF signal connecting portion so as to absorb assembly tolerance existing at the predetermined distance and to prevent disruption of the electric flow between the electrode pad and the RF signal connecting portion, wherein the terminal portion includes: first terminal which is in contact with the electrode pad; and the second terminal connected to the RF signal connecting portion.

Advantageous Effects

In accordance with the embodiments of the present disclosure, the cavity filter may have a slimmer and more compact structure because the RF connector is embedded in the filter body in the thickness direction thereof, may be assembled through an assembly method capable of minimizing the cumulated assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance.

BEST MODE FOR CARRYING OUT THE INVENTION

Figure 1:
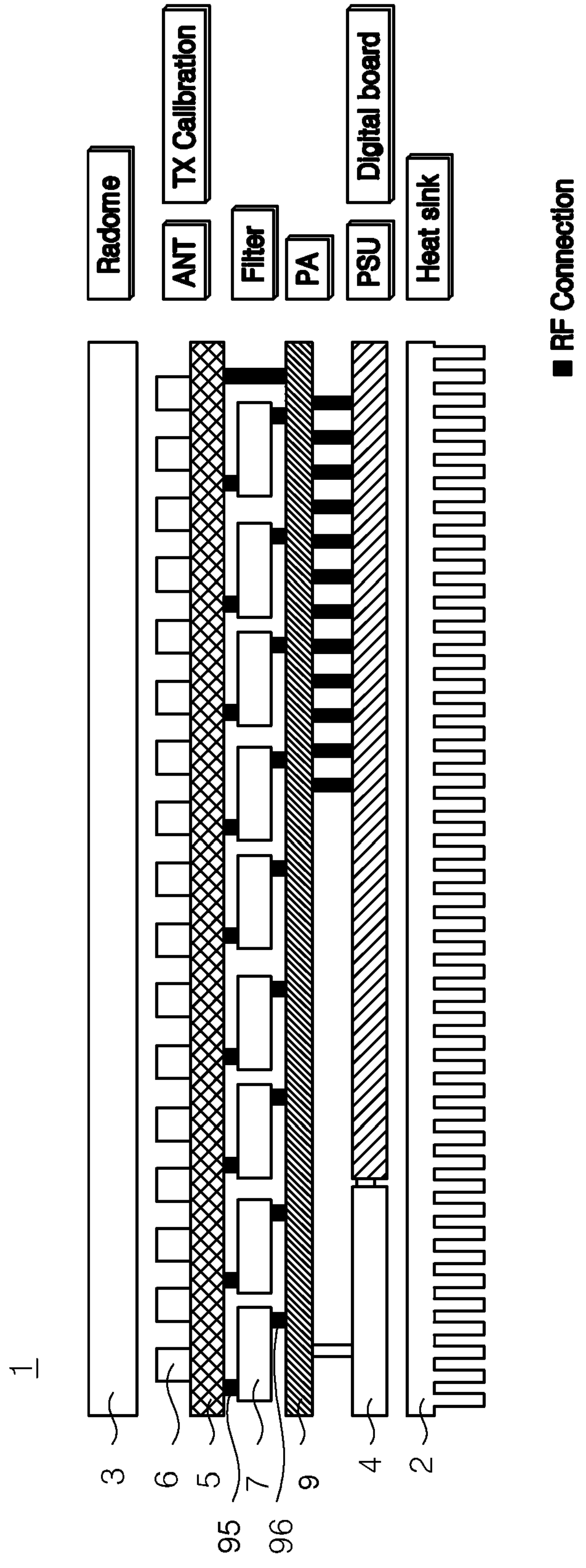
FIG. 1 is a diagram schematically illustrating a stacked structure of a massive MIMO antenna.

Hereafter, some embodiments of the present disclosure will be described in detail with reference to the accompanying drawings. It should be noted that, when components in each of the drawings are denoted by reference numerals, the same components are represented by like reference numerals, even though the components are displayed on different drawings. Furthermore, when it is determined that the detailed descriptions of publicly known components or functions related to the present disclosure disturb understandings of the embodiments of the present disclosure, the detailed descriptions thereof will be omitted herein.

When the components of the embodiments of the present disclosure are described, the terms such as "first," "second," "A," "B," "(a)" and "(b)" may be used. Each term is only used to distinguish the corresponding component from other components, and the nature or order of the corresponding component is not limited by the term. Furthermore, all terms used herein, which include technical or scientific terms, may have the same meanings as those understood by those skilled in the art to which the present disclosure pertains, as long as the terms are not differently defined. The terms defined in a generally used dictionary should be analyzed to have meanings which coincide with contextual meanings in the related art. So long as the terms are not expressly defined in this specification, the terms should not be interpreted as ideal or overly formal meanings.

FIG. 1 is a diagram schematically illustrating a stacked structure of a massive MIMO antenna.

FIG. 1 only illustrates an exemplary exterior of an antenna device 1 in which an antenna assembly including a cavity filter in accordance with an embodiment of the present disclosure is embedded, and does not limit the exterior of the antenna device 1 when components are actually stacked.

The antenna device 1 includes a housing 2 having a heat sink formed therein and a radome 3 coupled to the housing 2. Between the housing 2 and the radome 3, an antenna assembly may be embedded.

A PSU (Power Supply Unit) 4 is coupled to the bottom of the housing 2 through a docking structure, for example, and provides operation power for operating communication parts included in the antenna assembly.

Typically, the antenna assembly has a structure in which a number of cavity filters 7 equal to the number of antennas are disposed on a rear surface of an antenna (ANT) board 5 having a plurality of antenna elements 6 arranged on a front surface thereof, and a related PCB 9 is subsequently stacked. The cavity filters 7 may be connected to the rear surface of the antenna board 5 via a plurality of RF connectors 95, and may be connected to the related PCB 9 via a plurality of RF connectors 96, respectively. The cavity filters 7 may be thoroughly tuned and verified to individually have frequency characteristics suitable for the specification, and prepared before being mounted on the antenna board 5. Such a tuning and verification process may be rapidly performed in an environment with the same characteristics as the mounting state.

Figure 2:
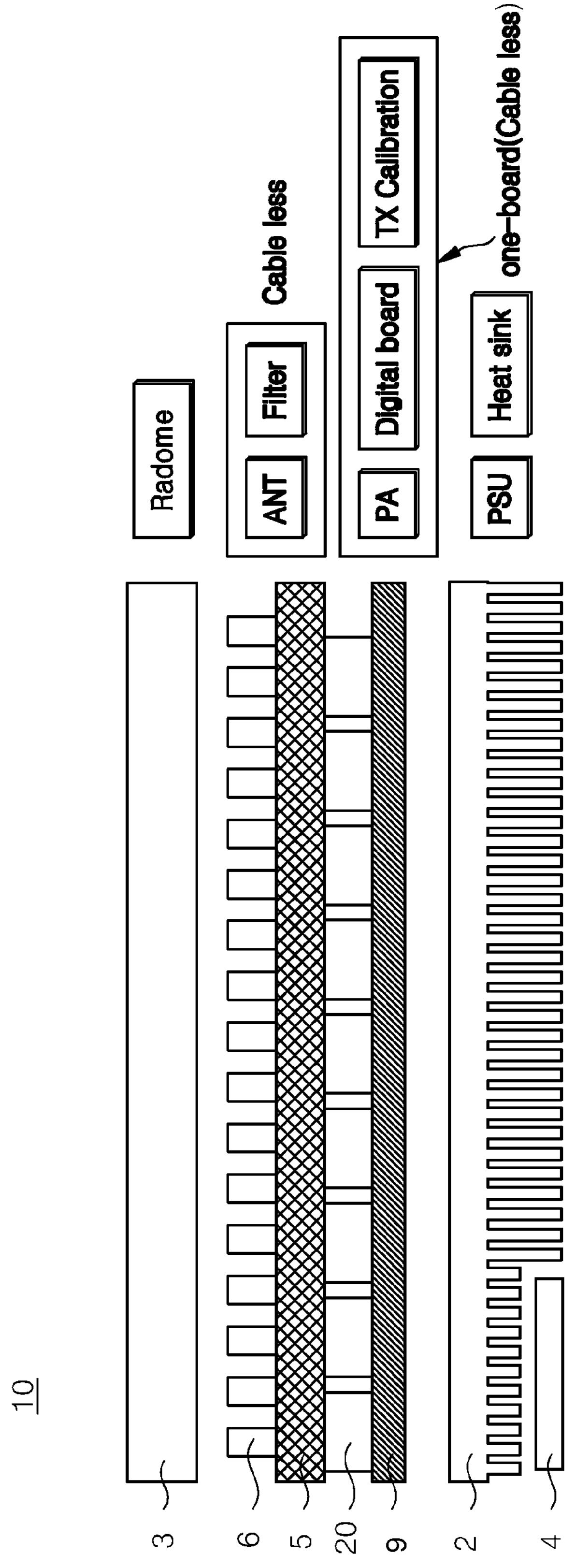
FIG. 2 is a cross-sectional view of an antenna device which illustrates that cavity filters in accordance with an embodiment of the present disclosure are stacked between an antenna board and a control board.

FIG. 2 is a cross-sectional view of an antenna device 10 which illustrates that cavity filters in accordance with an embodiment of the present disclosure are stacked between an antenna board and a control board.

Referring to FIG. 2, a cavity filter 20 in accordance with the embodiment of the present disclosure may exclude a typical RF connector (see reference numeral 95 of FIG. 1) illustrated in FIG. 1, which makes it possible to provide an antenna structure having a lower height profile while facilitating the connection.

Furthermore, an RF connecting portion is disposed on either surface of the cavity filter 20 in the height direction, and may be connected to the cavity filter 20 in accordance with the embodiment of the present disclosure. Although an external device configured as any one of an antenna board 5 and a PCB board 9 is vibrated or thermally deformed, the RF connection is equally maintained without a change in frequency characteristics.

Figure 3:
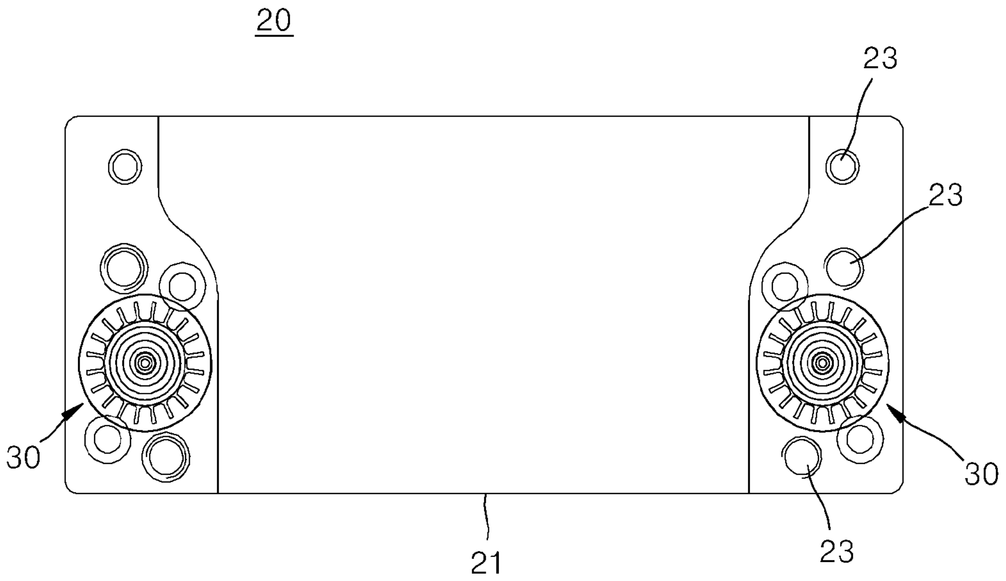
FIG. 3 is a planar perspective view of the structure of the cavity filter in accordance with the embodiment of the present disclosure, when seen from the bottom.

FIG. 3 is a planar perspective view of the structure of the cavity filter in accordance with the embodiment of the present disclosure, when seen from the bottom.

Figure 4:
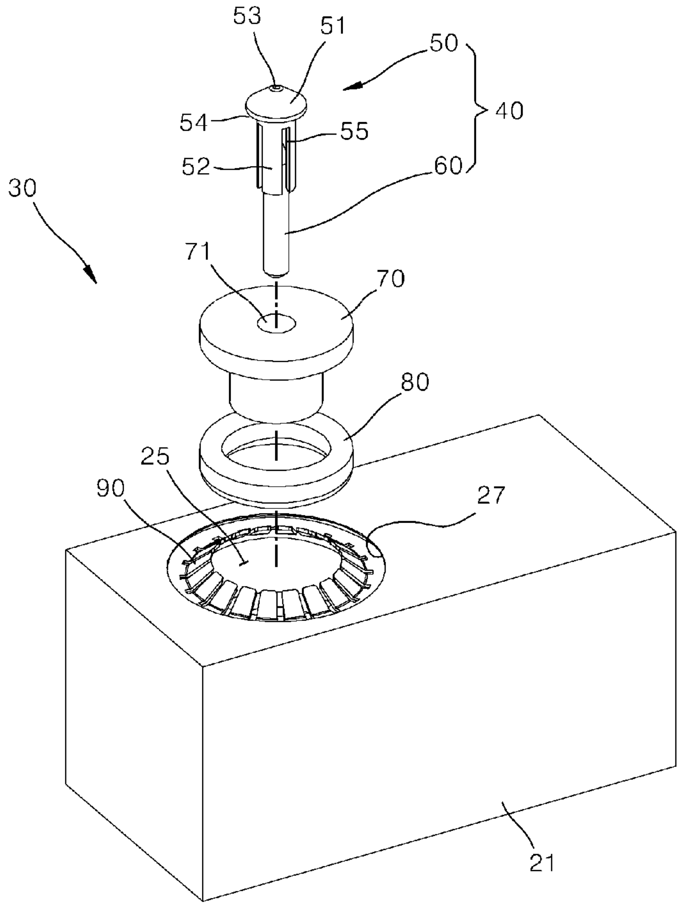
FIG. 4 is an exploded perspective view illustrating some components of a cavity filter in accordance with a first embodiment of the present disclosure.

Referring to FIG. 3, the cavity filter 20 in accordance with the embodiment of the present disclosure includes an RF signal connecting portion 31 (see reference numeral 31 in in FIGS. 5A and 5B and thereafter), a first case (with no reference numeral) having a hollow space therein, a second case (with no reference numeral) covering the first case, a terminal portion (see reference numeral 40 of FIG. 4) provided on either side of the first case in a longitudinal direction thereof and disposed in the height direction of the cavity filter 20, and a filter module 30 including a plurality of assembly holes 23, which will be used to assemble the filter body 21 to the antenna board 5 and the PCB 9, formed on both sides of the terminal portion 40 (FIG. 4). The terminal portion 40 electrically connects an electrode pad (with no reference numeral) of the external device 8 (FIGS. 5A and 5B) to the RF signal connecting portion 31 (FIGS. 5A and 5B) through a terminal insertion port (see reference numeral 25 of FIG. 4) formed in the first case, the external device 8 being configured as any one of an antenna board and a PCB board.

Figure 5A:
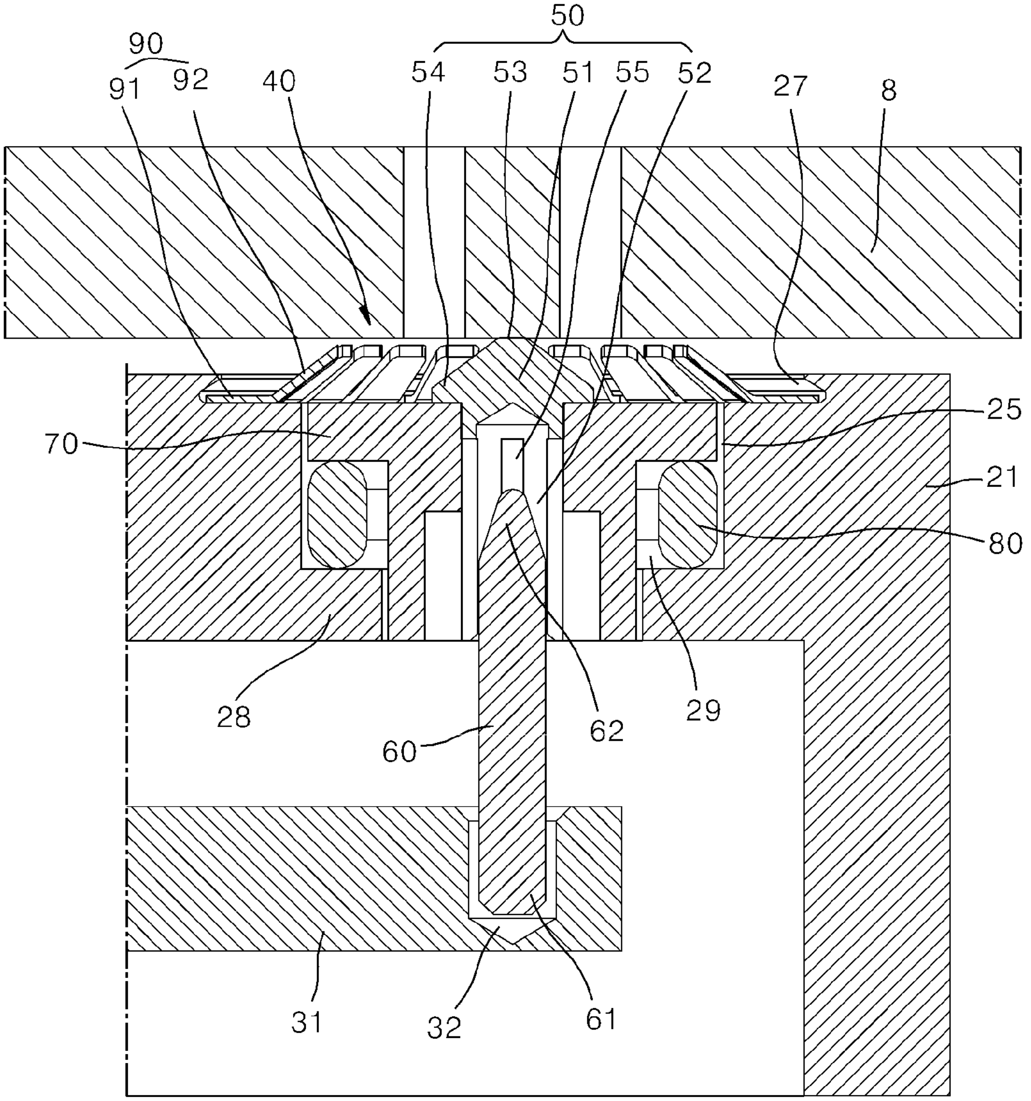
FIGS. 5A and 5B are cross-sectional views illustrating how assembly tolerance is absorbed before and after assembly.
Figure 5B:
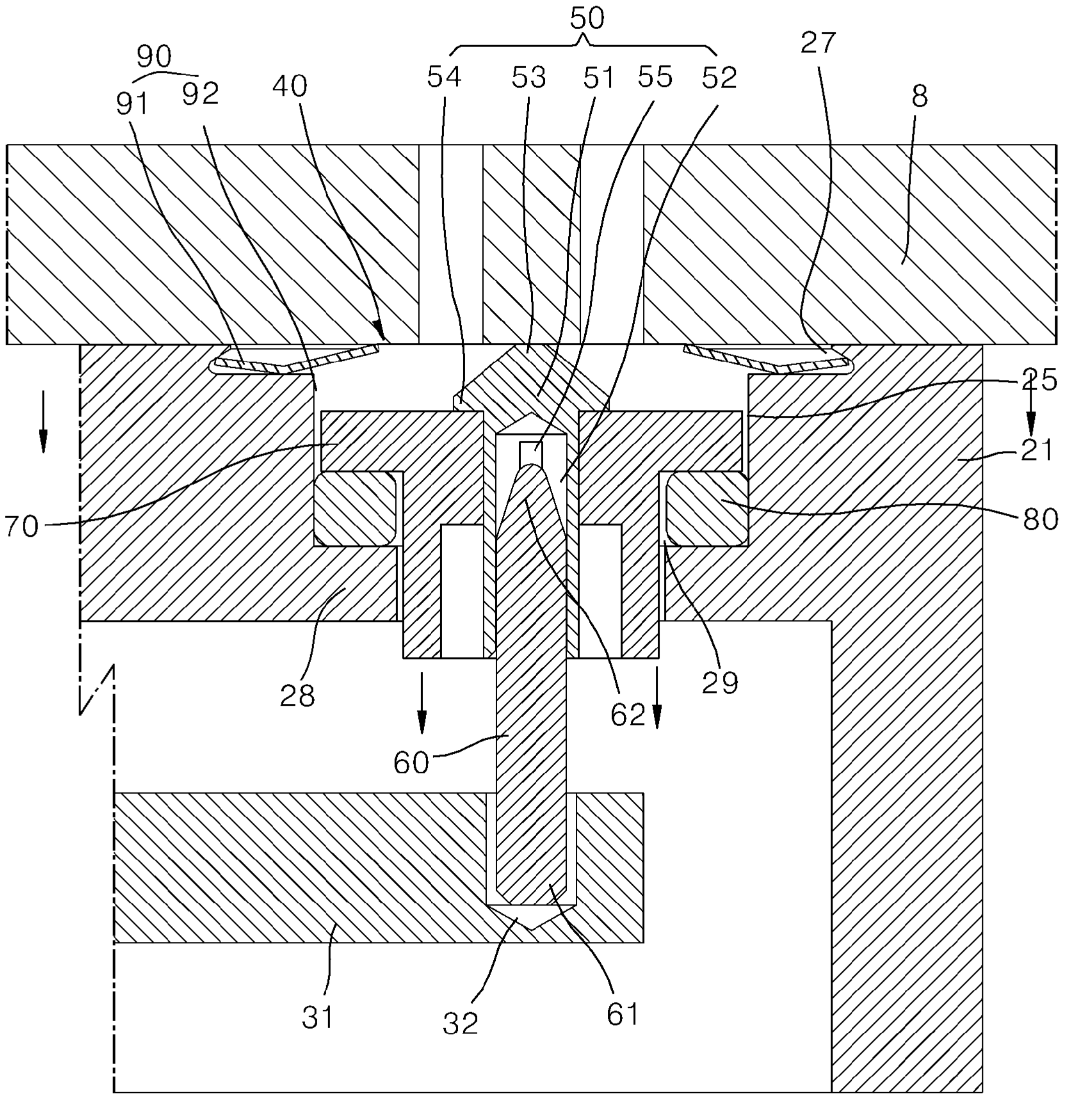

As shown in FIGS. 5A and 5B, the bottom of the terminal portion 40 in the drawings is supported by the RF signal connecting portion 31. When the external device 8 configured as any one of an antenna board and a PCB board is tightly coupled to the top of the terminal portion 40, the terminal portion 40 may be elastically supported to absorb assembly tolerance existing in the terminal insertion port 25, while constantly in contact with the external device 8 (specifically, the electrode pad provided on one surface of the external device 8).

That is, the terminal portion 40 of the cavity filter 20 in accordance with the embodiment of the present disclosure may be separated into a first terminal and a second terminal and implemented as various embodiments depending on a shape for applying lateral tension and a specific configuration for absorbing assembly tolerance, as described below.

More specifically, the terminal portion 40 may be provided as two members, i.e., an upper portion and a lower portion as illustrated in FIG. 4, and may be provided in a separation type in which a part of any one member of the two members is inserted into a part of the other member.

Although not illustrated, the terminal portion 40 is generally provided as an elastic body whose part is elastically deformed when a predetermined assembly force is applied by an assembler, in order to absorb assembly tolerance when the cavity filter is provided as an integrated filter. However, the integrated filter having the terminal portion 40 integrated therewith does not require a separate shape design for applying lateral tension, because a disruption of an electric flow from one end to the other end thereof is unlikely.

However, when the terminal portion 40 is provided as a separable filter separated into two members, a separate elastic member 80 may be provided to absorb assembly tolerance. Specifically, the entire length of the terminal portion 40 can be decreased in case the predetermined assembly force moves a first terminal 50 and a second terminal 60, which are separated from each other, so that a part of any of the first terminal 50 and the second terminal 60 is inserted in the other of the first terminal 50 and the second terminal 60, and increased and restored to the original state when the assembly force is removed. However, since the first terminal 50 and the second terminal 60 of the terminal portion 40 are separable from each other, there is a concern that an electric flow might become disrupted when the first terminal 50 and the second terminal 60 are moved with respect to each other so that a part of any of the first terminal 50 and the second terminal 60 is inserted into the other. Therefore, any one of the first terminal 50 and the second terminal 60 may be provided as an elastic body, or a separate shape change for applying lateral tension may be essentially required.

The term 'lateral tension' may be defined as a force which any one of the first terminal 50 and the second terminal 60 transfers to the other in a direction different from the longitudinal direction, in order to prevent the disruption of the electric flow between the first terminal 50 and the second terminal 60, as described above.

The antenna device is characterized in that, when the shape change in the terminal portion 40 is designed, impedance matching design in the terminal insertion port 25 needs to be performed in parallel. However, the embodiments of the cavity filter 20 in accordance with the present disclosure will be described in detail under the supposition that impedance matching is achieved in the terminal insertion port 25. Therefore, among the components of the embodiments of the cavity filter in accordance with the present disclosure, which will be described with reference to FIG. 4 and the following drawings, the exterior of a reinforcement plate or dielectric body inserted into the terminal insertion port 25 with the terminal portion 40 may have a different shape depending on impedance matching design.

Figure 6:
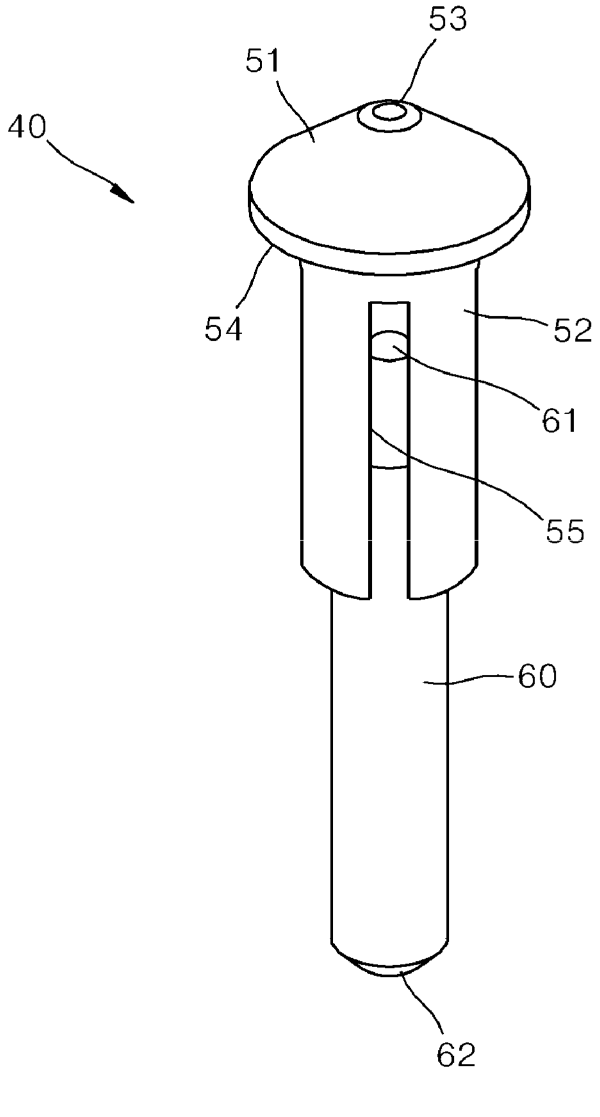
FIG. 6 is a perspective view illustrating a terminal portion among components of FIG. 4.

FIG. 4 is an exploded perspective view illustrating some components of a cavity filter in accordance with a first embodiment of the present disclosure, FIGS. 5A and 5B are cross-sectional views illustrating how assembly tolerance is absorbed before and after assembly, and FIG. 6 is a perspective view illustrating the terminal portion 40 among the components of FIG. 4.

As illustrated in FIGS. 4, 5A, 5B and 6, a cavity filter 20 (as shown in FIGS. 2 and 3) in accordance with the first embodiment of the present disclosure includes a filter module 30, which in turn includes an RF signal connecting portion 31 and a terminal portion 40. The RF signal connecting portion 31 is spaced part, by a predetermined distance, from an external device 8 having an electrode pad (with no reference numeral) provided on one surface thereof. The terminal portion 40 has a structure that can electrically connect the electrode pad of the external device 8 to the RF signal connecting portion 31, and not only absorb assembly tolerance at the predetermined distance, but also prevent disruption of the electric flow between the electrode pad and the RF signal connecting portion 31.

As illustrated in FIG. 2, the external device mentioned above may be commonly referred to as any one of an "antenna board" having antenna elements arranged on the other surface thereof and a PCB board 9 provided as a single board on which a PA (Power Amplifier), a digital board and TX calibration are integrated. Other reference numerals 2, 3, 4, 5 and 6 designate same or similar members shown in FIG. 1, and the description thereof is omitted.

Hereafter, as illustrated in FIG. 3, an exterior configuration constituting the embodiments of the cavity filter 20 in accordance with the present disclosure is not divided into first and second cases, and commonly referred to as a filter body 21 having a terminal insertion port 25 formed therein.

As illustrated in FIGS. 4, 5A and 5B, the terminal insertion port 25 of the filter body 21 may be provided as a hollow space. The terminal insertion port 25 may be formed in different shapes depending on impedance matching design applied to a plurality of embodiments which will be described below.

The filter body 21 may have a washer installation portion 27 formed as a groove on one surface thereof, on which the first terminal 50 of the terminal portion 40 to be described below is provided. The washer installation portion 27 may be formed as a groove to have a larger inner diameter than the terminal insertion port 25. Thus, the outer edge of a star washer 90 to be described below may be locked to the washer installation portion 27 such that the star washer 90 is prevented from being separated upward.

Furthermore, the cavity filter in accordance with the first embodiment of the present disclosure may further include the star washer 90 fixedly installed on the washer installation portion 27.

The following descriptions are based on the supposition that the star washer 90 is commonly provided in all the embodiments of the present disclosure, which will be described below, as well as the first embodiment of the present disclosure. Therefore, it should be understood that, although the star washer 90 is not described in detail in the embodiments other than the first embodiment, the star washer 90 is included in the embodiments.

The star washer 90 may include a fixed edge 91 (FIGS. 5A and 5B) formed in a ring shape and fixed to the washer installation portion 27, and a plurality of support pieces 92 (FIGS. 5A and 5B) which are upwardly inclined from the fixed edge 91 toward the center of the electrode pad of the external device 8 (FIGS. 5A and 5B) configured as any one of an antenna board and a PCB board.

When the embodiments of the cavity filter in accordance with the present disclosure are assembled to the external device 8 configured as any one of an antenna board and a PCB board by an assembler, the star washer 90 may apply an elastic force to a fastening force by a fastening member (not illustrated) through the above-described assembly hole, in case the plurality of support pieces 92 are supported on one surface of the external device 8 configured as any one of an antenna board and a PCB board.

The application of the elastic force through the plurality of support pieces 92 may make it possible to uniformly maintain a contact area with the electrode pad of the terminal portion 40.

Furthermore, the ring-shaped fixed edge 91 of the star washer 90 may be provided to cover an outer surface of the terminal portion 40 which is configured to transfer an electric signal, and serve as a kind of ground terminal.

Furthermore, the star washer 90 serves to absorb assembly tolerance existing between the external devices 8, each configured as any one of an antenna board and a PCB board, in the embodiments of the cavity filter in accordance with the present disclosure.

As described below, however, the assembly tolerance absorbed by the star washer 90 exists in the terminal insertion port 25, and is distinguished from an assembly tolerance absorbed by the terminal portion 40. That is, the cavity filter in accordance with the embodiments of the present disclosure may be designed to absorb overall assembly tolerances at two or more locations through separate members during a single assembly process, and thus coupled more stably.

As illustrated in FIGS. 4, 5A, 5B and 6, the terminal portion 40 in the cavity filter in accordance with the first embodiment of the present disclosure may include the first terminal 50 and the second terminal 60. The first terminal 50 may be in contact with the electrode pad of the external device 8, and the second terminal 60 may be fixed to a solder hole 32 formed in a portion extended as the RF signal connecting portion 31 in a plate shape.

Any one of the first terminal 50 and the second terminal 60 may be inserted into the other, such that parts of end portions of the respective terminals are engaged with each other by a predetermined length during an assembly process.

The cavity filter in accordance with the first embodiment of the present disclosure may have a structure in which the top of the second terminal 60 is inserted into the bottom of the first terminal 50 in the drawings (see FIGS. 5A and 5B). For this structure, a lower end portion of the first terminal 50 may be provided in a hollow pipe shape such that an upper end portion of the second terminal 60 is inserted into the lower end portion of the first terminal 50.

When the terminal portion 40 provided as the first terminal 50 and the second terminal 60 is installed in the terminal insertion port 25, a dielectric body 70 may be inserted to cover the outer surface of the terminal portion 40, for impedance matching in the terminal insertion port 25. The dielectric body 70 may be formed of polytetrafluoroethylene (PTFE) (known as Teflon®). However, the material of the dielectric body 70 is not limited to PTFE (Teflon®), but can be replaced with any materials as long as the materials have a dielectric constant at which impedance matching in the terminal insertion port 25 can be achieved. The dielectric body 70 may be formed as a single body with the first terminal 50 of the terminal portion 40 through injection molding. When the dielectric body 70 is formed as a single body with the first terminal 50 through injection molding, a terminal through-hole 71 (see FIG. 4) may be formed, in which a part of the first terminal 50 penetrates.

However, the dielectric body does not necessarily need to be manufactured through the method for forming the dielectric body as a single body with the first terminal 50 of the terminal portion 40 through injection molding. In other words, the dielectric body 70 may be separately formed to have the terminal through-hole 71, and inserted and assembled into the terminal insertion port 25.

The smaller the contact area of a contact portion 53 of the first terminal 50, which is in contact with the external device 8 configured as any one of an antenna board and a PCB board, the better. Therefore, the contact portion 53 serving as the uppermost portion of the first terminal 50 may be formed in a cone shape having a width that gradually decreases toward the top thereof, as illustrated in FIGS. 5A and 5B.

When an assembler applies an assembly force through an operation of bringing the first terminal 50 into contact with the electrode pad of the external device 8 through the contact portion 53 serving as the uppermost portion, the first terminal 50 may be moved along with the dielectric body 70 in the terminal insertion port 25 in a top-to-bottom direction in the drawings. Here, the top-to-bottom direction is defined as a direction from the electrode to the RF signal connecting portion. For this operation, the first terminal 50 may have a locking end 54 formed at an upper end portion 51 thereof and having a larger diameter than the terminal through-hole 71 formed in the dielectric body 70.

Furthermore, a lower end portion 52 of the first terminal 50, into which the upper end portion of the second terminal 60 is inserted, may have a plurality of tension cut portions 55 elongated in the top-to-bottom direction. The tension cut portions 55 may be formed by dividing the lower end portion 52 of the first terminal 50, formed in a hollow pipe shape, into a plurality of portions.

The tension cut portions 55 serve to apply the above-described lateral tension through an operation of pressing the lower end portion 52 of the first terminal 50 against the outer circumference of an upper end portion 61 of the second terminal 60 inserted in the lower end portion 52. The dielectric body 70 is provided to support the outer circumferential surface of the first terminal 50, where the tension cut portions 55 are formed, toward the inside thereof. Thus, the inner surfaces of the lower end portions 52 divided by the tension cut portions 55 are constantly pressed against the outer circumferential surface of the upper end portion 61 of the second terminal 60 inserted in the first terminal 50.

The application of the lateral tension through the tension cut portions 55 may make it possible to prevent disruption of the electric flow between the two separated terminals of the terminal portion 40.

The cavity filter in accordance with the first embodiment of the present disclosure may further include an O-ring portion 80 disposed in the terminal insertion port 25 and positioned on the outer circumferential surface of the dielectric body 70 so as to absorb assembly tolerance in the terminal insertion port 25.

The O-ring portion 80 may be positioned on the outer circumferential surface of the dielectric body 70, and disposed in a ring installation space 29 (FIGS. 5A and 5B) which is formed as a predetermined space between the inner surfaces of the terminal insertion port 25 as the dielectric body 70 is partially cut. Furthermore, the O-ring portion 80 may be supported by an insertion slot support portion 28 (FIGS. 5A and 5B) which is formed as a part of the filter body 21 so as to protrude toward the center of the terminal insertion port 25.

When the contact portion 53 serving as the uppermost portion of the first terminal 50 of the terminal portion 40 is tightly assembled to the electrode pad of the external device 8 as illustrated in FIG. 5B, the O-ring portion 80 is compressed and deformed in the ring installation space 29 while absorbing assembly tolerance existing in the terminal insertion port 25 as described above, and then provides an elastic force to the dielectric body 70 such that the contact portion 53 of the first terminal 50 is continuously in contact with the electrode pad.

The uppermost portion 62 of the second terminal 60 of the terminal portion 40 may be formed in a cone shape, and thus easily inserted into the hollow pipe shape of the first terminal 50, and a lowermost portion 61 (FIGS. 5A and 5B) of the second terminal 60 may be soldered and fixed to the solder hole 32 formed in the plate of the above-described RF signal connecting portion 31.

Therefore, when the first terminal 50 is moved downward along with the dielectric body 70 with the lowermost end 61 of the second terminal 60 fixed to the RF signal connecting portion 31, the second terminal 60 may be further deeply inserted into the lower end portion 52 of the first terminal 50, formed in a hollow pipe shape, and decrease the overall top-to-bottom length of the terminal portion 40, thereby absorbing the assembly tolerance existing in the terminal insertion port 25.

As illustrated in FIGS. 5A and 5B, the first terminal 50 may be formed to such a height that the contact portion 53 protrudes above the support pieces 92 among the components of the star washer 90, when no assembly force is applied.

Hereafter, an assembly tolerance absorption process during an assembly process of the cavity filter in accordance with the first embodiment of the present disclosure, which has the above-described configuration, will be described with reference to the accompanying drawings (specifically, FIGS. 5A and 5B).

First, as illustrated in FIG. 5A, a predetermined fastening force is transferred to the cavity filter in accordance with the first embodiment of the present disclosure through an operation of bringing the cavity filter into contact with one surface of the external device 8 having the electrode pad provided thereon and configured as any one of an antenna board and a PCB board, and then fastening a fastening member (not illustrated) to the assembly hole 23 (FIG. 3). However, the cavity filter does not necessarily need to be in contact with one surface of the external device 8 configured as any one of an antenna board and a PCB board. On the contrary, the one surface of the external device 8 configured as any one of an antenna board and a PCB board may be in contact with the cavity filters arranged at predetermined intervals, in order to transfer an assembly force.

Then, as illustrated in FIG. 5B, the distance between the external device 8 configured as any one of an antenna board and a PCB board and the cavity filter in accordance with the first embodiment of the present disclosure may be decreased. Simultaneously, the support pieces 92 of the star washer 90 may be deformed by the above-described fastening force to initially absorb assembly tolerance existing between the cavity filter in accordance with the first embodiment of the present disclosure and the external device 8 configured as any one of an antenna board and a PCB board.

Simultaneously, the first terminal 50 of the terminal portion 40 is pressed by the one surface of the external device 8 configured as any one of an antenna board and a PCB board, and moved along with the dielectric body 70 by a predetermined distance toward the second terminal 60 in the terminal insertion port 25. Furthermore, the O-ring portion 80 is also pressed to additionally absorb the assembly tolerance existing in the terminal insertion port 25 of the cavity filter in accordance with the first embodiment of the present disclosure.

Furthermore, since the lower end portion of the first terminal 50 applies lateral tension to the upper end portion of the second terminal 60, inserted into the first terminal 50 formed in a hollow pipe shape, through the tension cut portions 55, it is possible to prevent disruption of the electric flow between the first terminal 50 and the second terminal 60, thereby preventing degradation in signal performance of the cavity filter in accordance with the first embodiment of the present disclosure.

FIG. 6 is a perspective view illustrating the terminal portion among components shown in FIG. 4. The components 40, 51, 52, 53, 54, 55, 60, 61 and 62 shown in FIG. 6 are already described with reference to FIGS. 4, 5A and 5B.

Figure 7:
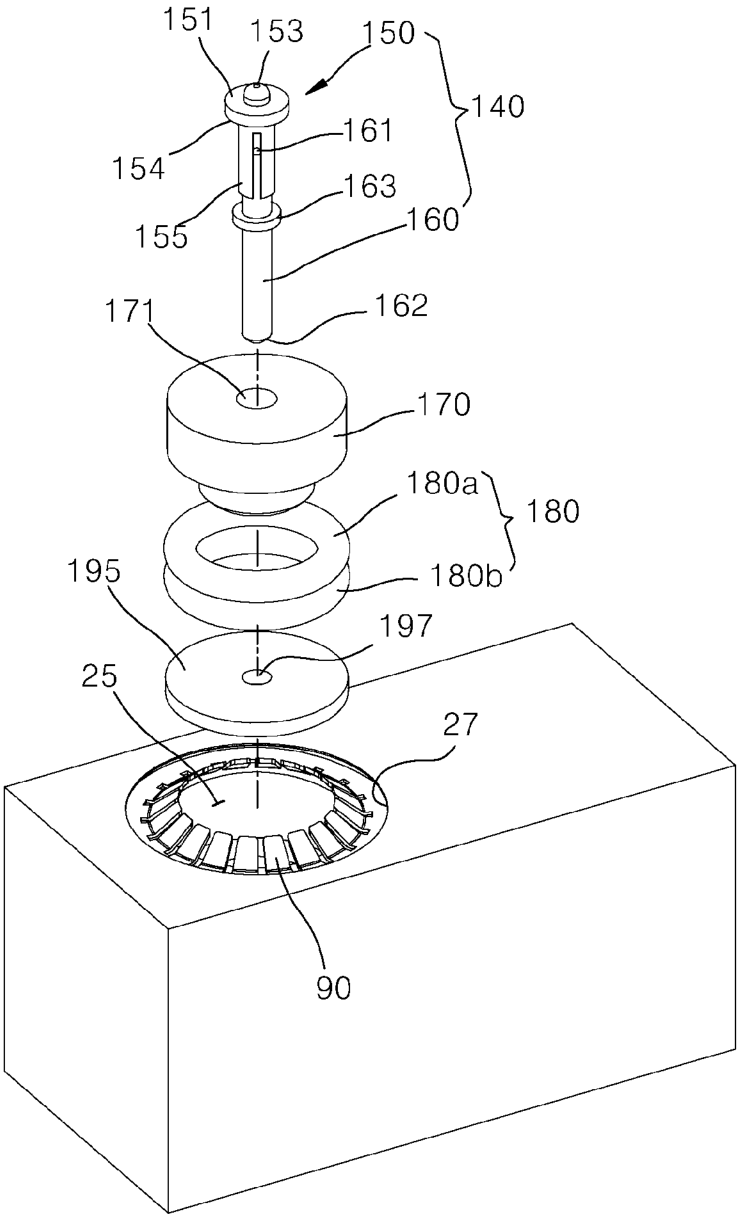
FIG. 7 is an exploded perspective view illustrating a cavity filter in accordance with a second embodiment of the present disclosure.
Figure 8:
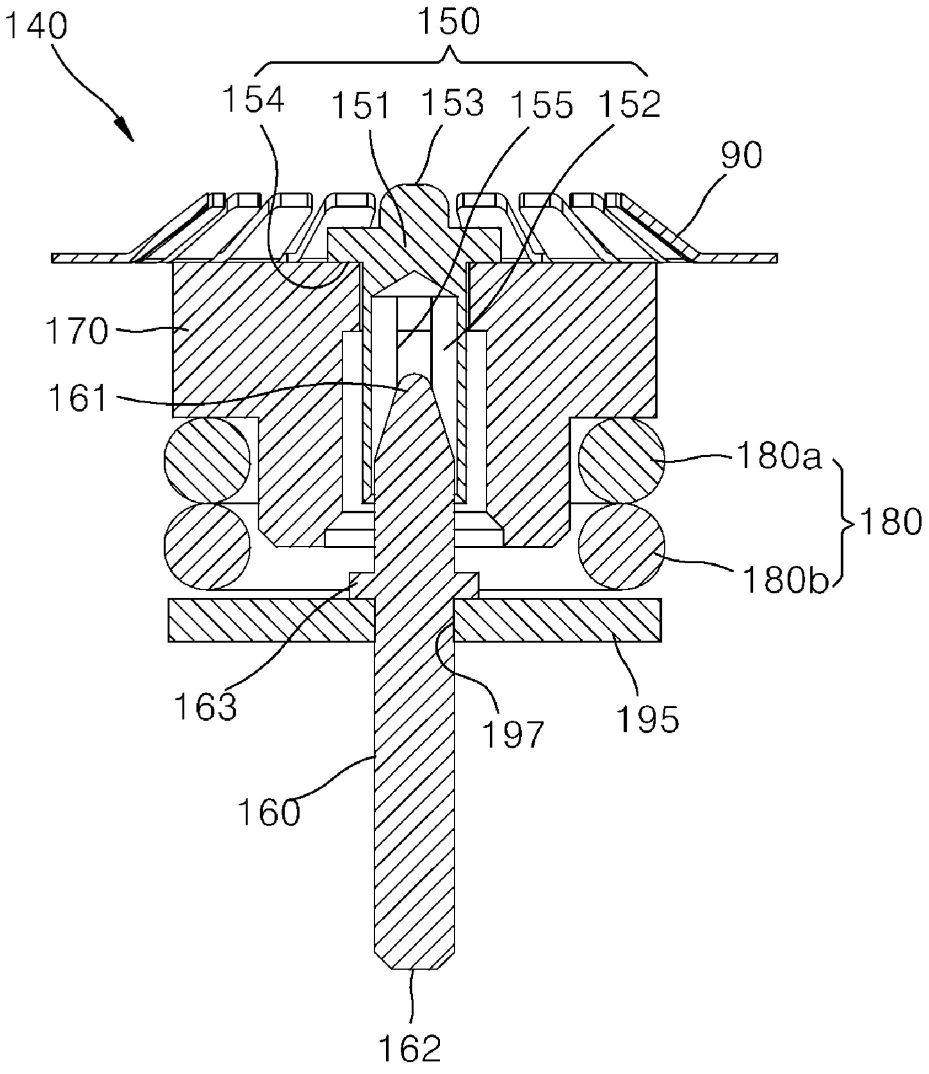
FIG. 8 is a cross-sectional view illustrating the cavity filter in accordance with the second embodiment of the present disclosure.
Figure 9:
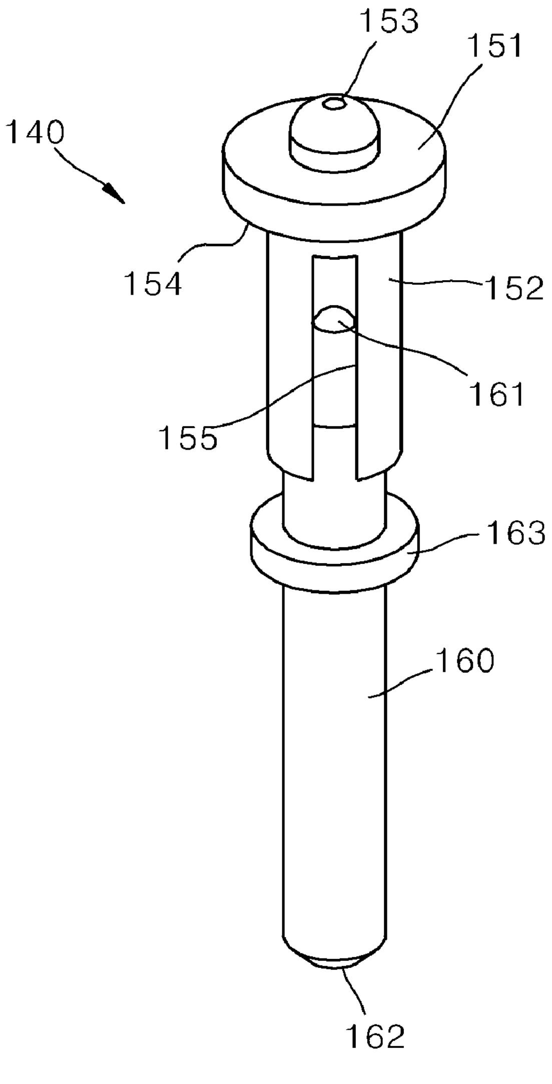
FIG. 9 is a perspective view illustrating a terminal portion among components of FIG. 7.

FIG. 7 is an exploded perspective view illustrating a cavity filter in accordance with a second embodiment of the present disclosure, FIG. 8 is a cross-sectional view illustrating the cavity filter in accordance with the second embodiment of the present disclosure, and FIG. 9 is a perspective view illustrating a terminal portion among components of FIG. 7.

As illustrated in FIGS. 7, 8 and 9, a cavity filter in accordance with the second embodiment of the present disclosure includes an RF signal connecting portion 31 (not shown in FIGS. 7-9; similar to the ones shown in FIGS. 5A and 5B), a terminal portion 140 including a first terminal 150 and a second terminal 160, a dielectric body 170 inserted into a terminal insertion port 25 so as to cover an outer surface of the terminal portion 140, and a reinforcement plate 195 for reinforcing the RF signal connecting portion 31. An upper end portion 161 of the second terminal 160 is a same or similar member to the upper end portion 61 shown in FIG. 4, and a detailed description thereof will be omitted.

The RF signal connecting portion 31, the terminal portion 140, the dielectric body 170 and sub components thereof are configured in the same manner as those of the cavity filter in accordance with the first embodiment of the present disclosure, which has been already described above, unless specifically described below. Thus, the detailed descriptions thereof will be omitted, and same or similar members with same reference numerals perform a same or similar function. The following descriptions will be focused on differences from those of the first embodiment.

As illustrated in FIG. 7, the reinforcement plate 195 may have a terminal through-hole 197 in which a lower portion of the second terminal 160 penetrates, and the second terminal 160 may be fixed to the terminal through-hole 197 of the reinforcement plate 195. The second terminal 160 may have a locking end 163 which has a larger diameter than the terminal through-hole 197 so as to be locked to the top surface of the reinforcement plate 195 through the terminal through-hole 197 of the reinforcement plate 195.

The bottom surface of the circumference of the reinforcement plate 195 may be supported by an insertion slot support portion 28 (not shown in FIGS. 7-9; similar to the one shown in FIGS. 5A and 5B) formed in the terminal insertion port 25, and an O-ring portion 180 may be supported on the top surface of the reinforcement plate 195, as illustrated in FIG. 8. The washer installation portion 27 in FIG. 7 is a same or similar member to the washer installation portion 27 shown in FIGS. 4, 5A and 5B, and a detailed description thereof will be omitted.

The reinforcement plate 195 serves to restrict the dielectric body 170 from being moved downward, while a lower end of the dielectric body 170 is locked to the top surface of the reinforcement plate 195, when the dielectric body 170 is moved downward along with the first terminal 150 by an assembly force applied by an assembler.

Furthermore, the reinforcement plate 195 serves to restrict the downward movement of the second terminal 160 through the locking end 163, thereby substantially reinforcing the RF signal connecting portion 31 to which a lowermost portion 162 of the second terminal 160 is soldered and fixed.

That is, in the cavity filter in accordance with the first embodiment, the dielectric body 70 moved by the assembly force may be supported within the terminal insertion port 25 only by way of the O-ring portion 80. However, in the cavity filter in accordance with the second embodiment, the dielectric body 170 may be directly supported by the reinforcement plate 195, and thus indirectly reinforce the RF signal connecting portion 31.

As an additional difference between the cavity filter in accordance with the first embodiment and the cavity filter in accordance with the second embodiment, the O-ring portion 180 in accordance with the second embodiment may include two O-rings 180*a* and 180*b* stacked in the top-to-bottom direction. Since the two O-rings 180*a* and 180*b* are stacked in the top-to-bottom direction, the O-ring portion 180 in accordance with the second embodiment may absorb a larger amount of assembly tolerance than the cavity filter in accordance with the first embodiment, which has a single O-ring portion 80. Furthermore, each of the two O-rings 180*a* and 180*b* included in the cavity filter in accordance with the second embodiment may have a smaller thickness than the O-ring portion 80 of the cavity filter in accordance with the first embodiment.

Furthermore, the cavity filter in accordance with the second embodiment and the cavity filter in accordance with the first embodiment may have different structures from each other as described below. In the cavity filter in accordance with the first embedment, the upper end portion 51 of the first terminal 50 may have a rounded cone shape to minimize the contact area of the above-described contact portion 53 as much as possible, i.e. a predetermined contact area. In the cavity filter in accordance with the second embodiment, however, a contact portion 153 formed on the first terminal 150 may have the same contact area as that of the first embodiment, i.e. a predetermined contact area, but an upper end portion 151 of the first terminal 150 may be formed in such a shape that the hemispheric contact portion 153 having a rounded upper end may protrude from the top surface of the locking end 154 which has a larger diameter than the terminal through-hole 171 of the dielectric body 170 and thus is locked to the terminal through-hole 171.

When an assembly force of an assembler is applied to the cavity filter in accordance with the second embodiment, which has the above-described configuration, the dielectric body 170 and the first terminal 150 may be pressed downward to additionally absorb assembly tolerance existing in the terminal insertion port 25. Furthermore, lateral tension provided by tension cut portions 155 formed in the first terminal 150 may prevent disruption of an electric flow.

FIG. 8 is a cross-sectional view illustrating the cavity filter in accordance with the second embodiment of the present disclosure, and FIG. 9 is a perspective view illustrating the terminal portion among components in accordance with the second embodiment of the present disclosure. The components 140, 150, 151, 153, 154, 155, 160, 161, 162, 163, 170, 180, 180*a*, 180*b*, 195 and 197 shown in FIGS. 8 and 9 are already described with reference to FIG. 6. The lower end portion 152 of the first terminal 150 shown in FIG. 8 is a same or similar member to the lower end portion 52 of the first terminal 50 shown in FIGS. 4, 5A and 5B, and a detailed description thereof will be omitted.

Figure 10:
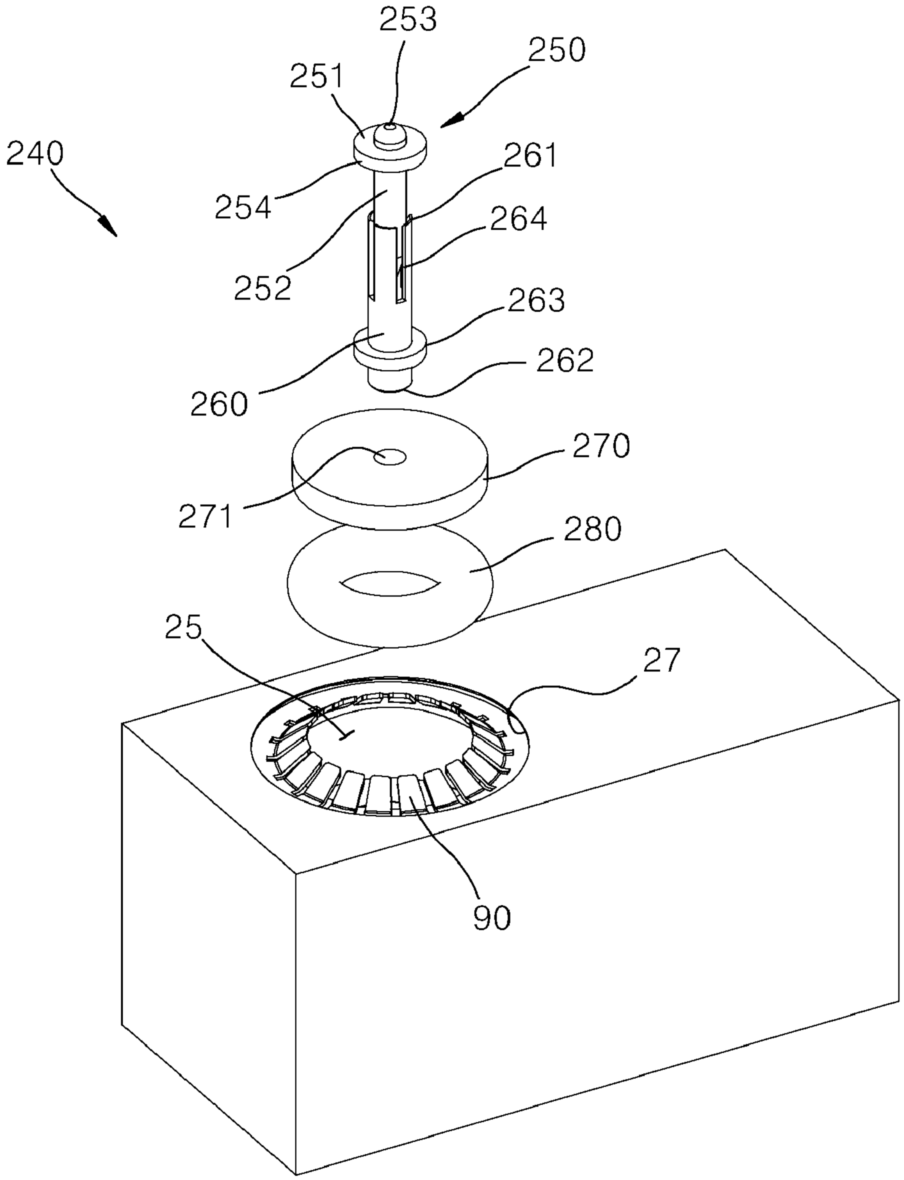
FIG. 10 is an exploded perspective view illustrating a cavity filter in accordance with a third embodiment of the present disclosure.
Figure 11:
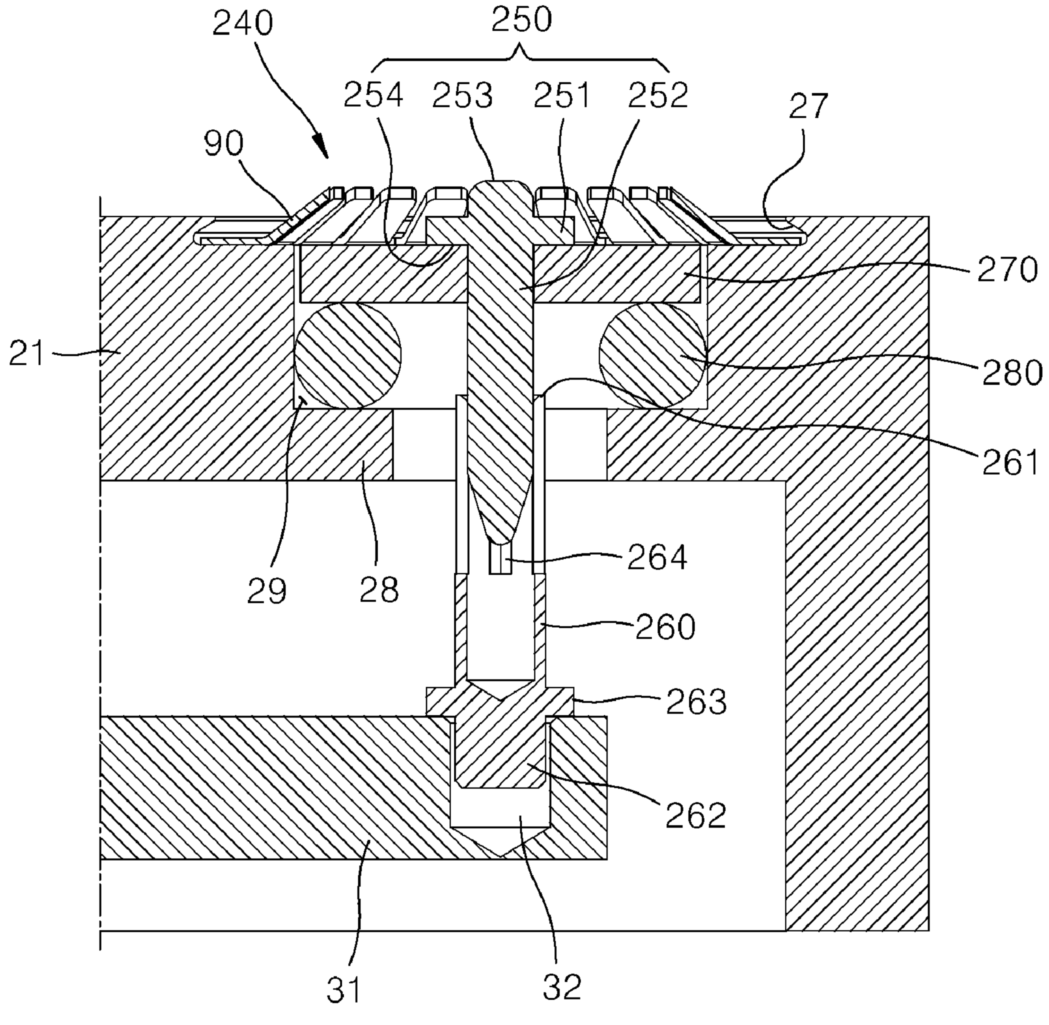
FIG. 11 is a cross-sectional view illustrating the cavity filter in accordance with the third embodiment of the present disclosure.
Figure 12:
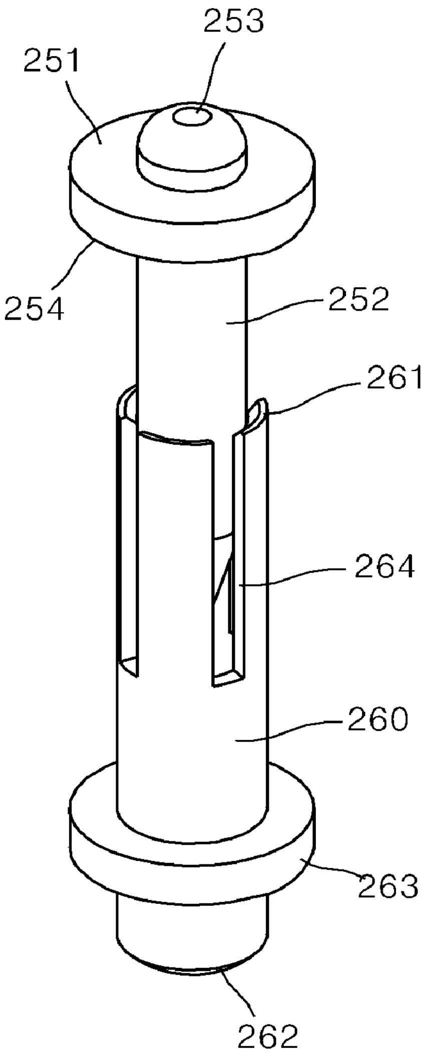
FIG. 12 is a perspective view illustrating a terminal portion among components of FIG. 10.

FIG. 10 is an exploded perspective view illustrating a cavity filter in accordance with a third embodiment of the present disclosure, FIG. 11 is a cross-sectional view illustrating the cavity filter in accordance with the third embodiment of the present disclosure, and FIG. 12 is a perspective view illustrating a terminal portion among components of FIG. 10.

As illustrated in FIGS. 10 to 12, a cavity filter in accordance with the third embodiment of the present disclosure includes an RF signal connecting portion 31 (FIG. 11), a terminal portion 240, a dielectric body 270 and an O-ring portion 280.

Among the components of the cavity filter in accordance with the third embodiment of the present disclosure, the RF signal connecting portion 31, the O-ring portion 280 serving as an elastic member, and sub components thereof are configured in the same manner as those of the cavity filters in accordance with the first and second embodiments, which have been already described, unless specifically described below. Thus, the detailed descriptions thereof will be omitted, and same or similar members with same reference numerals perform a same or similar function.

However, the terminal portion 240 among the components of the cavity filter in accordance with the third embodiment of the present disclosure is different from the terminal portions in accordance with the first and second embodiments in that tension cut portions 264 are formed at an upper end portion 261 of a second terminal 260, and a lower end portion 252 of the first terminal 250 is formed in a cone shape and inserted in the upper end portion 261 of the second terminal 260 provided in a hollow pipe shape.

Furthermore, unlike the cavity filter in accordance with the first or second embodiment, in which the separate ring installation space 29 (FIGS. 5A and 5B) for installation of the O-ring portion 280 is formed by cutting the dielectric body 270, the dielectric body 270 in accordance with the third embodiment may be formed in a disk shape having a terminal through-hole 271 (FIG. 10) formed therein, and the O-ring portion 280 may be simply seated between the top surface of an insertion slot support portion 28 of a terminal insertion port 25 and the bottom surface of the dielectric body 270. Therefore, the dielectric body 270 may be provided for impedance matching within the terminal insertion port 25, and function as a plate which transfers an assembly force of an assembler to the O-ring portion 280 when the first terminal 250 is moved downward by the assembly force applied by the assembler.

The outer circumferential surface of the upper end portion 261 of the second terminal 260 having the tension cut portions 264 formed therein, unlike those of the cavity filters in accordance with the first and second embodiments, is in contact with the inner surfaces of the lower end portions divided by the tension cut portions. Therefore, the upper end portion 261 of the second terminal 260 may be inclined at a predetermined angle toward the center of the second terminal 260 when the tension cut portions 264 are formed.

At this time, the upper end portion 261 of the second terminal 260 may be inclined so that the lower end portion 252 of the first terminal 250, formed in a cone shape, is inserted in the upper end portion 261 of the second terminal 260 formed in a hollow pipe shape. The members designated by reference numerals 251, 253, 254, 262 and 263 correspond to the members 151, 151, 154, 162 and 163 shown in FIGS. 7 to 9, and detailed description thereof will be omitted.

Furthermore, the upper end portion of the terminal portion 240 of the cavity filter in accordance with the third embodiment, which includes a contact portion 253 of the first terminal 250, has the same shape as that of the second embodiment.

When an assembly force of an assembler is applied to the cavity filter in accordance with the third embodiment, which has the above-described configuration, the dielectric body 270 and the first terminal 250 may be pressed downward to additionally absorb assembly tolerance existing in the terminal insertion port 25. Furthermore, lateral tension provided by the tension cut portions 264 formed in the second terminal 260 may prevent disruption of an electric flow.

Figure 13:
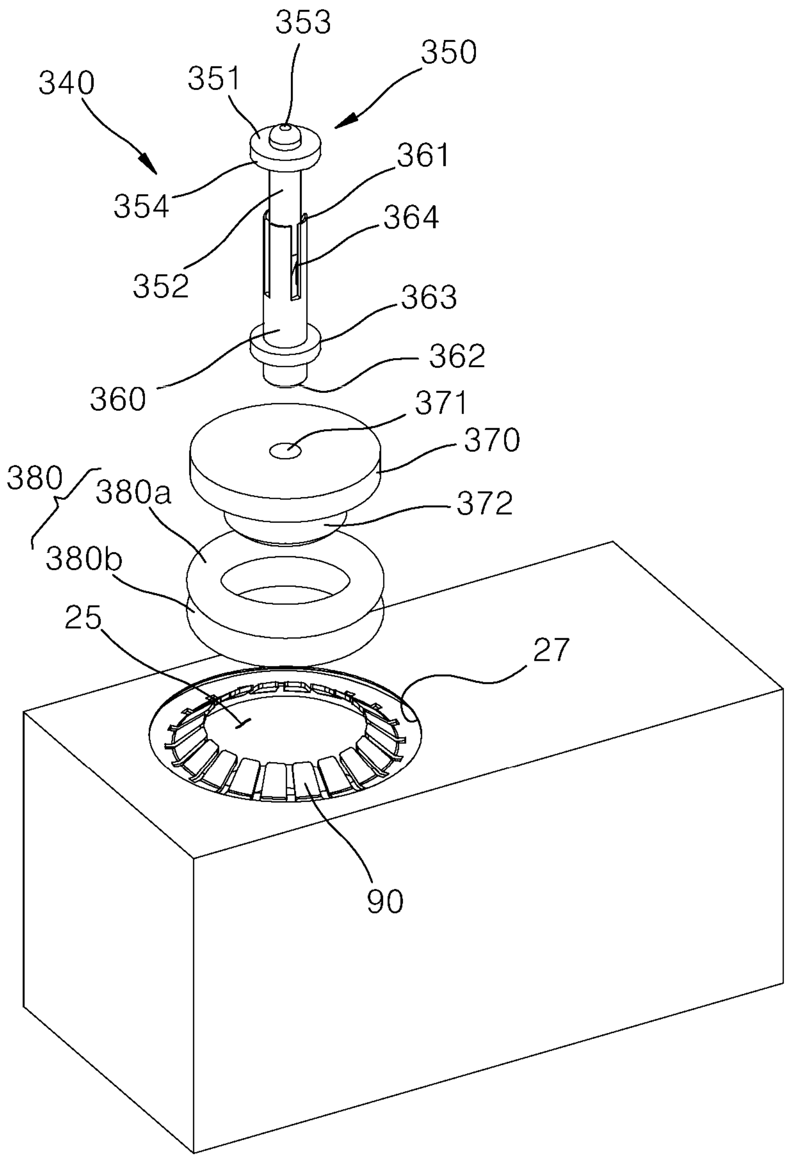
FIG. 13 is an exploded perspective view illustrating a cavity filter in accordance with a fourth embodiment of the present disclosure.
Figure 14:
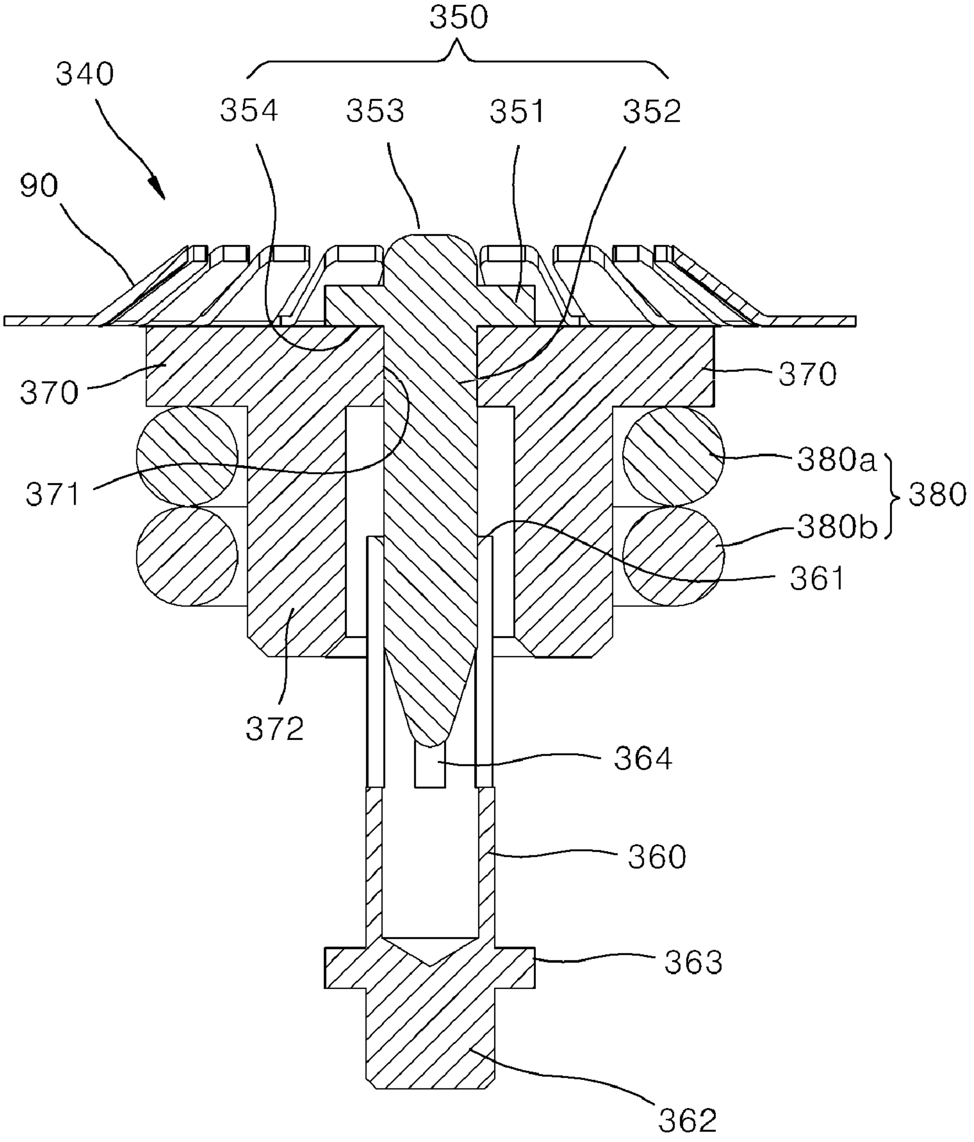
FIG. 14 is a cross-sectional view illustrating the cavity filter in accordance with the fourth embodiment of the present disclosure.
Figure 15:
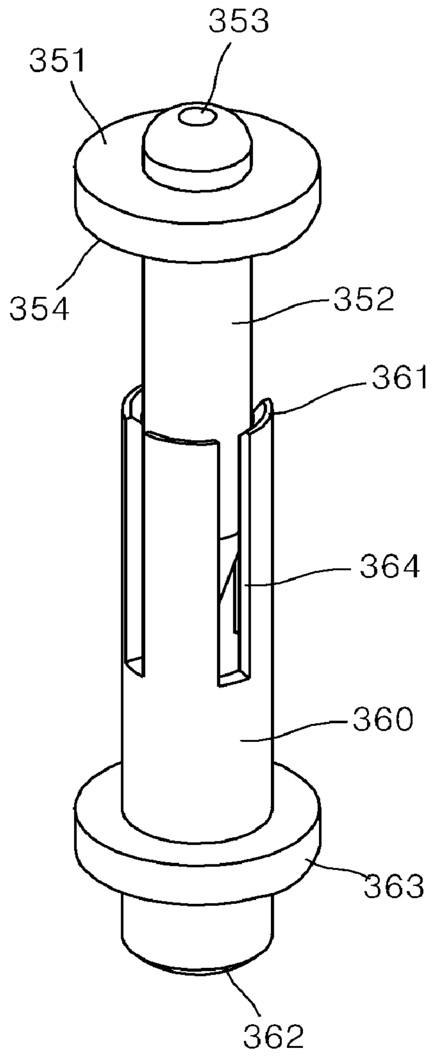
FIG. 15 is a perspective view illustrating a terminal portion among components of FIG. 13.

FIG. 13 is an exploded perspective view illustrating a cavity filter in accordance with a fourth embodiment of the present disclosure, FIG. 14 is a cross-sectional view illustrating the cavity filter in accordance with the fourth embodiment of the present disclosure, and FIG. 15 is a perspective view illustrating a terminal portion among components of FIG. 13.

As illustrated in FIGS. 13 to 15, a cavity filter in accordance with the fourth embodiment of the present disclosure includes an RF signal connecting portion 31, a terminal portion 340 including a first terminal 350 and a second terminal 360, a dielectric body 370 inserted into a terminal insertion port 25 so as to cover the outer surface of the terminal portion 340, and an O-ring portion 380 serving as an electrical member.

Among the components of the cavity filter in accordance with the fourth embodiment of the present disclosure, the RF signal connecting portion 31, the terminal portion 340 and sub components thereof are configured in the same manner as those of the cavity filter in accordance with the third embodiment, which has been already described, unless specifically described below. Thus, the detailed descriptions thereof will be omitted, and same or similar members with same reference numerals perform a same or similar function.

Furthermore, among the components of the cavity filter in accordance with the fourth embodiment of the present disclosure, the O-ring portion 380 may have a structure in which two O-rings 380*a* and 380*b* are stacked in the top-to-bottom direction as described with reference to the second embodiment. However, unlike the cavity filter of the second embodiment, the cavity filter in accordance with the fourth embodiment of the present disclosure does not include a reinforcement plate by which the O-ring portion 380 is supported. That is, in the cavity filter in accordance with the fourth embodiment of the present disclosure, the O-ring portion 380 may be seated and supported on an insertion slot support portion provided in the terminal insertion port 25, as in the first embodiment.

Among the components of the cavity filter in accordance with the fourth embodiment of the present disclosure, an upper end portion 361 of the second terminal 360 having tension cut portions 364 formed therein has a structure in which the outer surface thereof is not supported by the dielectric body 370, as in the third embodiment. That is, as illustrated in FIG. 14, the dielectric body 370 is extended downward so that a lower end portion 372 thereof is inserted in the upper end portion 361 of the second terminal 360. However, the extension is only an inevitable shape change for impedance matching design, and is not involved in lateral tension of the second terminal 360.

When an assembly force of an assembler is applied to the cavity filter in accordance with the fourth embodiment, which has the above-described configuration, the dielectric body 370 and the first terminal 350 may be pressed downward to additionally absorb assembly tolerance existing in the terminal insertion port 25. Furthermore, lateral tension provided by the tension cut portions 364 formed in the second terminal 360 may prevent disruption of an electric flow.

The members designated by reference numerals 351, 352, 353, 354, 362, 363 and 371 correspond to the members 151, 152, 153, 154, 162, 163 and 171 shown in FIGS. 7 to 9, and detailed description thereof will be omitted.

Figure 16:
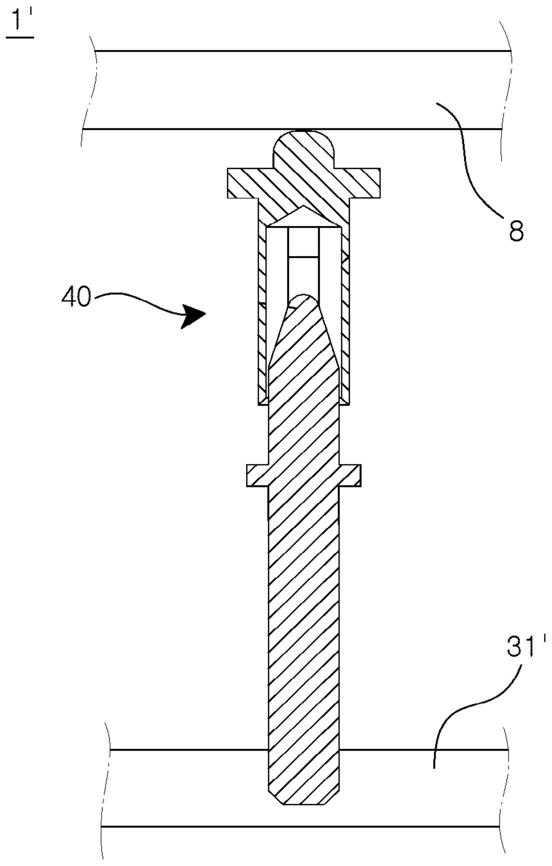
FIG. 16 is a cross-sectional view illustrating a connecting structure in accordance with a modified embodiment of the present disclosure.

FIG. 16 is a cross-sectional view illustrating a connecting structure in accordance with a modified embodiment of the present disclosure.

It has been described that each of the cavity filters in accordance with the various embodiments of the present disclosure, which have been described so far, is fabricated as one module and attached to one surface of the external device 8 configured as any one of an antenna board and a PCB board. However, the embodiments of the present disclosure are not necessarily limited thereto. According to a modification illustrated in FIG. 16, the cavity filter may be implemented as a connection structure 1' having the terminal portion 40 which is provided between the electrode pad provided on one surface of the external device 8 and another connection member 31', and makes an electrical connection with the connection member 31', regardless of whether the cavity filter is manufactured in the form of a module.

The above-described contents are only exemplary descriptions of the technical idea of the present disclosure, and those skilled in the art to which the present disclosure pertains may change and modify the present disclosure in various manners without departing from the essential properties of the present disclosure.

Therefore, the embodiments disclosed in the present disclosure do not limit but describe the technical idea of the present disclosure, and the scope of the technical idea of the present disclosure is not limited by the embodiments. The scope of the protection of the present disclosure should be construed by the following claims, and all technical ideas within a range equivalent to the claims should be construed as being included in the scope of rights of the present disclosure.

INDUSTRIAL APPLICABILITY

The present disclosure provides a cavity filter which can have a slimmer and more compact structure because an RF connector is embedded in the filter body in the thickness direction thereof, may be assembled through an assembly method capable of minimizing the cumulated assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance, and a connecting structure included therein.

The invention claimed is:

1. A cavity filter comprising:

an RF signal connector spaced apart, by a predetermined distance, from an external device having an electrode pad provided on a surface thereof; and a terminal portion configured to electrically connect the electrode pad of the external device and the RF signal connector, wherein the terminal portion comprises:

a first terminal in contact with the electrode pad; and a second terminal connected to the RF signal connector, wherein the terminal portion is inserted in a terminal insertion port formed in a filter body having the RF signal connector provided therein, wherein the cavity filter further comprises a dielectric body inserted in the terminal insertion port so as to cover an outer surface of the terminal portion, and wherein the first terminal of the terminal portion is disposed in the terminal insertion port and moves with the dielectric body by an assembly force applied by an assembler, and wherein a part of any one of the first terminal and the second terminal is inserted into the other of the first terminal and the second terminal by a predetermined length.

2. The cavity filter of claim 1, wherein a contact portion of the first terminal of the terminal portion, which is in contact with the electrode pad, has a rounded upper end formed in a hemispherical shape with a predetermined contact area.

3. The cavity filter of claim 1, wherein a contact portion of the first terminal of the terminal portion, which is in contact with the electrode pad, has an upper end formed in a round cone shape with a predetermined contact area.

4. The cavity filter of claim 1, wherein the dielectric body has a terminal through-hole in which any one of the first terminal and the second terminal penetrates, and the any one of the first terminal and the second terminal, which penetrates the terminal through-hole, has a larger diameter than the terminal through-hole so as to be locked to the dielectric body.

5. The cavity filter of claim 1, wherein the second terminal of the terminal portion is soldered and fixed to a solder hole formed in a plate extended from the RF signal connector.

6. The cavity filter of claim 1, further comprising an elastic member positioned on an outer circumferential surface of the dielectric body, and configured to elastically support the dielectric body when the dielectric body moves in the terminal insertion port by the assembly force applied by the assembler.

7. The cavity filter of claim 6, wherein the elastic member comprises two stacked O-rings.

8. The cavity filter of claim 1, wherein any one of the first terminal and the second terminal has a plurality of tension cut portions.

9. The cavity filter of claim 8, wherein the tension cut portions are provided in the first terminal, and an upper end portion of the second terminal is inserted in a lower end portion of the first terminal.

10. The cavity filter of claim 8, wherein the tension cut portions are provided in the second terminal, and a lower end portion of the first terminal is inserted in an upper end portion of the second terminal.

11. The cavity filter of claim 8, wherein the dielectric body supports an outer circumferential surface of the any of the first terminal or the second terminal having the plurality of tension cut portions formed therein.

12. A cavity filter comprising:

an RF signal connector spaced apart, by a predetermined distance, from an external device having an electrode pad provided on a surface thereof; and a terminal portion configured to electrically connect the electrode pad of the external device and the RF signal connector, wherein the terminal portion comprises:

a first terminal in contact with the electrode pad; and a second terminal connected to the RF signal connector, wherein the terminal portion is inserted in a terminal insertion port formed in a filter body having the RF signal connector provided therein, and wherein the cavity filter further comprises a reinforcement plate configured to reinforce the RF signal connector provided in the terminal insertion port.

13. The cavity filter of claim 12, wherein the reinforcement plate is fixed to an insertion slot support portion protruding toward the terminal insertion port, as a part of the filter body.

14. The cavity filter of claim 12, wherein the reinforcement plate has a terminal through-hole in which any one of the first terminal and the second terminal penetrates, and the any one of the first terminal and the second terminal, which penetrates the terminal through-hole, has a larger diameter than the terminal through-hole so as to be locked to the reinforcement plate.

15. A connecting structure comprising:

an RF signal connector spaced apart, by a predetermined distance, from an external device having an electrode pad provided on a surface thereof; and a terminal portion configured to electrically connect the electrode pad of the external device and the RF signal connector, wherein the terminal portion comprises:

a first terminal in contact with the electrode pad; and a second terminal connected to the RF signal connector, wherein the second terminal of the terminal portion is soldered and fixed to a solder hole formed in a plate extended from the RF signal connector.

* * * * *